July 1, 1969 H. EDWARDS ET AL 3,453,168
APPARATUS FOR THE MANUFACTURE OF POLYURETHANE
FOAM CORE SANDWICH
Filed June 29, 1964

INVENTORS
HARRY EDWARDS
ALAN METCALF WOOLER
By
Cushman, Darby & Cushman
ATTORNEYS

# United States Patent Office 3,453,168
Patented July 1, 1969

3,453,168
APPARATUS FOR THE MANUFACTURE OF POLY-
URETHANE FOAM CORE SANDWICH
Harry Edwards and Alan Metcalf Wooler, Manchester,
England, assignors to Imperial Chemical Industries
Limited, London, England, a corporation of Great
Britain
Filed June 29, 1964, Ser. No. 378,801
Claims priority, application Great Britain, July 25, 1963,
29,534/63
Int. Cl. B32b 5/20, 31/06, 31/26
U.S. Cl. 156—499                                8 Claims

ABSTRACT OF THE DISCLOSURE

Apparatus for the continuous manufacture of laminated articles having a polyurethane foam core sandwiched between and bonded to two outer sheets of facing material, at least one of said sheets being flexible, which comprises a conveyor system consisting essentially of spaced, upper and lower conveying means, for contacting respectively one of the two outer sheets of facing material and moving them in parallel disposition to each other, the lower conveying means contacting and conveying a flexible outer sheet, a fixed surface anterior to said conveyor system having a transverse extent substantially equal to the transverse extent of said lower flexible sheet and across which said lower flexible outer sheet passes before coming into contact with said conveyor system, said fixed surface being slightly curved in the direction in which the lower flexible outer sheet passes across it, and a foam dispensing means above said fixed surface for applying a suitable mixture of polyurethane foam forming ingredients to the upper surface of said lower flexible outer sheet during its passage across said fixed surface.

---

Figures 1, 2:
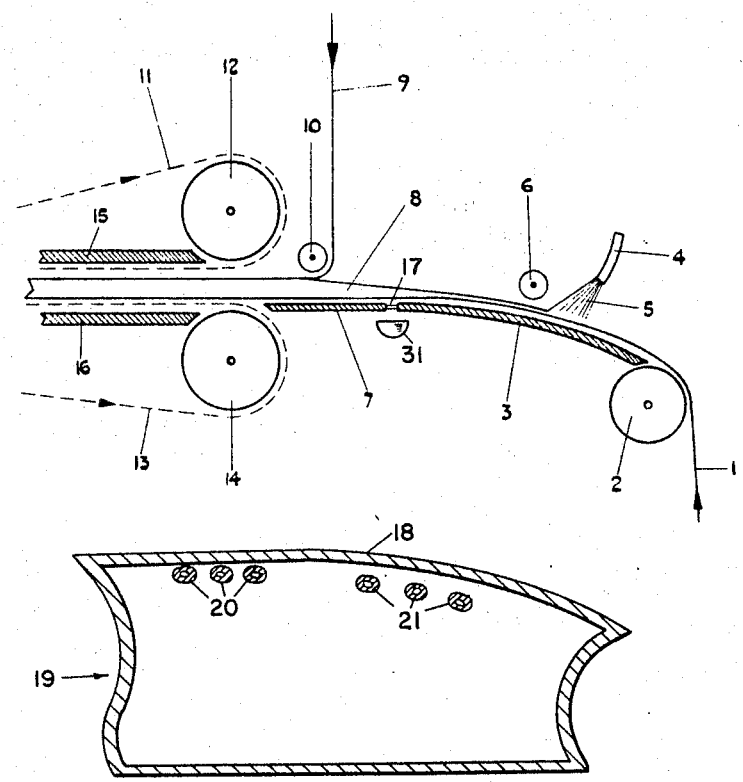

This invention relates to the manufacture of laminated articles and more particularly to the continuous manufacture of laminated articles having a plastic or resinous foam core.

It is already known to manufacture laminated articles having a plastic or resinous foam core sandwiched between and bonded to two outer sheets of facing material. A machine suitable for the continuous manufacture of such laminated articles consists essentially of a conveyor system and a foam dispensing unit. The conveyor system serves to bring the two sheets of facing material into the correct disposition relative to one another, to hold them in this position while the foam core is formed between them and at the same time to move them through the machine. In practice the two sheets of facing material are disposed one above the other and at a distance apart equal to the thickness of foam core which is desired in the final laminated article. Before the sheets are brought into this disposition the foam-forming ingredients are applied to the lower of the two sheets by means of the foam dispensing unit. The sheets are then brought into the correct disposition by means of the conveyor system, and formation and setting of the foam core occurs and is accelerated by the action of heat.

More specifically, a machine suitable for the continuous manufacture of said laminated articles has a conveyor system consisting of upper and lower conveying surfaces, which are parallel to each other and move in cooperation with each other. The conveying surfaces are formed from endless belts of suitable material and are driven in cooperation with each other by some suitable means. The endless belts may be composed of woven fabric or of wire mesh which may if desired be covered with rubber or with a plastic material. The conveying surfaces are backed and supported by platens. The lower conveying surface is arranged to project in front of the upper conveying surface so as to form a platform. The foam-forming ingredients are applied to the lower sheet of facing material during its passage across the projecting platform. After the upper and lower sheets of facing material have been brought into correct disposition relative to each other, with the lower sheet carrying the foam-forming ingredients, they are heated to bring about formation and setting of the foam core. Heating is effected by heating the platens backing the upper and lower conveying surfaces, for example by means of electric heating elements.

The foam-forming ingredients are applied to the lower sheet of facing material in a ready-mixed form. Mixing and dispensing of the foam-forming ingredients is achieved by using a mixing and dispensing device such as that described in United Kingdom patent specification No. 913,-611 in which mixing and dispensing are brought about by means of compressed air. The mixing and dispensing device is mounted on a back plate attached to a traverse system. The traverse system causes the mixing and dispensing device to move laterally to and fro across the width of the moving lower sheet of facing material so as to apply the foam-forming ingredients as far as possible in an even layer.

The use of such a machine enables reasonably satisfactory laminated articles to be produced. Certain disadvantages are apparent however, in the operation of such a process. Thus the foam-forming ingredients in the form of a liquid mixture are dispensed to the lower sheet of facing material from a single source. This source is caused to traverse to and fro across the width of the sheet in order to obtain a more uniform distribution of the liquid mixture. Obtaining a flat, even layer of liquid, however, depends also on the surface of the lower sheet of facing material being smooth and even, and on the ability of the liquid mixture to flow out and form an even layer. If a flat, even liquid layer of foam-forming ingredients is not obtained the resulting foam core will be uneven. For example, where insufficient liquid mixture is present on a particular area of the lower sheet of facing material, gaps may be formed in the foam core. These could lead to a reduction in the mechanical strength of the finished laminated article or to an impairment of its thermal insulating properties. These disadvantages are particularly apparent when it is desired to produce a laminated article with only a thin foam core, or when the laminated article is unusually wide and the foam dispensing device has a long traverse to and fro across the width of the lower sheet of facing material or when it is desired to operate the process at a high output rate and the velocity of the lower sheet of facing material under the foam dispensing device is high.

Since reaction between the foam-forming ingredients commences from the moment they are mixed, the liquid mixture is already starting to swell, thicken and gel as soon as it is dispensed on to the lower sheet of facing material. The rate of this reaction is of course increased by an increase in temperature. The time available for the liquid mixture to flow out and form an even layer before it is too thick to do so is therefore very limited.

We have now found an improved process for the continuous manufacture of laminated articles having a plastic or resinous foam core by means of which an even liquid layer of foam-forming ingredients is obtained initially and a laminated article with a uniform core is obtained finally.

According to our invention we provide, in a process for the continuous manufacture of laminated articles having a plastic or resinous foam core sandwiched between and bonded to two outer sheets of facing material which comprises applying a liquid mixture of foam-forming ingredients to the lower of two sheets of facing material and then causing the upper and lower sheets to move parallel to one another at a distance apart equal to the desired thickness of the core while heating to bring about formation and setting of the foam core, the improvement wherein the liquid mixture of the foam-forming ingredients is applied to the lower sheet during its passage across a fixed surface.

Our invention also includes an apparatus for carrying out the improved process of our invention which comprises a conveying means for contacting the two outer sheets of facing material and moving them in parallel disposition to each other, a fixed surface anterior to the said conveying means across which the lower of the said two sheets passes before coming into contact with the said conveying means, and a foam dispensing means above the said fixed surface for applying a liquid mixture of foam-forming ingredients to the said lower sheet during its passage across the said fixed surface.

The conveying means and the foam-dispensing means of the apparatus of our invention may be any suitable conveying means and foam-dispensing means known to the art for the manufacture of laminated articles having a plastic or resinous foam core sandwiched between and bonded to two outer sheets of facing material, for example the conveying means and foam-dispensing means which are hereinbefore described.

As already mentioned, obtaining a flat, even liquid layer of foam-forming ingredients depends in part on the lower sheet of facing material being smooth and even. The sheets of facing material used in the manufacture of the laminated articles with which this invention is concerned may both be flexible or one may be rigid and the other flexible. Where the lower sheet of facing material is rigid, the smoothness of the surface on to which the liquid mixture of foam-forming ingredients is dispensed is determined at a prior stage of manufacture and is not influenced during the stage of manufacture with which this invention is concerned. Where, however, the lower sheet of facing material is flexible the smoothness of the sheet on to which the liquid mixture is dispensed will be influenced by the tension in the sheet and by the smoothness of the underlying surface. Where, as hitherto, the underlying surface is the lower conveying surface extended for the purpose of forming a platform to support the facing material while the foam-forming ingredients are applied to it, the surface of the flexible sheet of facing material will tend to assume any imperfections in the underlying conveying surface. Since the conveying surface is formed from an endless belt which is in constant motion, imperfections in the surface inherent in the method of construction or developing from the manner of use are liable to be present. According to our invention, however, the liquid mixture of foam-forming ingredients is applied to the lower sheet of facing material during its passage across a fixed surface. An advantage of a fixed surface is that it can be made as rigid and as smooth as desired and it is not liable to be distorted by constant motion. In consequence it can be ensured that a flexible lower sheet of facing material has a smooth surface during its passage across the fixed surface, so that obtaining a flat, even liquid layer of mixed foam-forming ingredients is facilitated.

In the manufacture of laminated articles by the already known process as herein described it is desirable that the liquid mixture of foam-forming ingredients on the lower sheet of facing material shall have foamed and gelled to an appreciable extent before the upper sheet of facing material is brought into the correct disposition relative to the lower sheet. Foaming and gelling of the mixed foam-forming ingredients can be accelerated by raising the temperature. However, if the temperature of the liquid mixture of foam-forming ingredients is raised as soon as the liquid is applied to the lower sheet of facing material, foaming and gelling may take place so rapidly that the liquid mixture has no chance to flow out into a flat, even layer. According to the process of our invention, however, the lower sheet of facing material passes across a fixed surface, and it is therefore possible by heating or cooling different areas of the fixed surface to ensure firstly that the temperature of the liquid mixture of foam-forming ingredients while the mixture is in the zone in which it is dispensed on to the lower sheet of facing material is kept low so as to delay foaming and gelling and promote flow of the liquid into a flat, even layer, and secondly that the temperature of the liquid mixture after it passes from the dispensing zone is raised so as to promote foaming and gelling prior to the introduction of the upper sheet of facing material. Such differential heating of different areas of the fixed surface forms an additional feature of our invention.

Instead of heating different areas of the fixed surface, it can be arranged that there are gaps in the fixed surface through which the lower sheet of facing material can be exposed to sources of radiant heat, for example infrared heaters. The tension in the sheet of facing material can normally be adjusted so as to keep the sheet taut across the gap, but in particular circumstances it may be convenient to provide some additional support for the facing material, for example by providing thin lateral supporting members to bridge the gap, and through which the radiation may pass.

It is an advantage of the process of our invention, in which the lower sheet of facing material passes over a fixed surface, that there is direct contact between the sheet and a heated or cooled surface so that supplying heat to or removing heat from the liquid mixture of foam-forming ingredients is facilitated, and the heat transfer is uniform. Where, as hitherto, the lower sheet of facing material is backed, in the region in which the liquid mixture is dispensed, with the conveying surface, heating or cooling can be applied to the conveying surface only indirectly, for example by heating or cooling the underlying platen. Heat transfer is then frequently not uniform owing to the varying degree of contact with the heated surface. By using the process of our invention, therefore, it is much easier to promote the even flow-out of the liquid mixture of foam-forming ingredients by keeping the temperature low in the zone in which dispensing of the liquid mixture takes place and subsequently to promote initial foaming and gelling of the liquid mixture after it has passed from the dispensing zone. This advantage of the process of our invention applies whether the lower sheet of facing material is flexible or rigid.

Where the lower sheet of facing material is flexible, in order to ensure that contact between the sheet and the fixed surface is as close as possible, it is an advantage to have the fixed surface slightly curved in the direction in which the sheet passes across it. The provision of a slightly curved fixed surface forms an additional feature of our invention.

The process of our invention assists in obtaining a flat, even liquid layer of mixed foam-forming ingredients on the lower sheet of facing material and thus in obtaining a laminated article having a continuous, even foam core. We have found, however, that by the use of certain additional features in conjunction with the process of our invention a flat, even liquid layer of mixed foam-forming ingredients is even more readily obtained.

One such feature involves the use of a modified nozzle for the foam dispensing device. As already described, the liquid mixture of foam-forming ingredients is dispensed from a single source which is caused to traverse to and fro across the width of the lower sheet of facing material while the sheet itself is travelling forward. This tends to lay down the mixture on the sheet in a zigzag pattern, and obtaining a flat, even layer of liquid then depends on the liquid being able to flow out in order to fill in the gaps between the zigzag strips. We have found, however, that by using a modified nozzle for the foam-dispensing device the width of the zigzag strips of liquid may be increased, so that the gaps between them are reduced or the strips may even meet or overlap. The modified nozzle consists in a nozzle having a fan-shaped distribution pattern, the width of the fan being in the direction of travel of the lower sheet of facing material across the fixed surface. The area of the sheet covered by the fan shaped jet emerging from such a nozzle increase as the distance of the nozzle from the sheet increases, and it is therefore desirable that the traversing mechanism for the foam dispensing device incorporates means of raising or lowering the device relative to the sheet so as to obtain the most even distribution of the liquid mixture on the sheet. Where the nozzle is attached to a mixing head such as that described in patent specification No. 913,611 in which mixing and dispensing are brought about by means of compressed air, the nozzle may conveniently be angled forward so that the excess air helps in the even distribution of the liquid mixture. The use of a nozzle having a fan-shaped distribution pattern for applying the liquid mixture of foam-forming ingredients to the lower sheet of facing material during its passage across a fixed surface forms an additional feature of our invention.

Another feature which assists in the product of a flat even liquid layer of mixed foam-forming ingredients when used in conjunction with the process of our invention is the use of a suitably disposed jet or jets of air. Such a jet of air has the same function as for example a brush in smoothing out a layer of liquid, or of a knife or doctor blade in ensuring that the surface of the liquid is flat and even. There are serious disadvantages in using a brush itself or a knife or doctor blade itself to achieve these purposes when working with a liquid mixture of foam-forming ingredients, for it is then found that the foam-forming ingredients build up on the brush or blade and very quickly set to form a hard foamed mass which seriously interferes with the even application of the liquid mixture to the lower sheet of facing material and quickly renders the whole process inoperable. When, however, a jet of air is used to smooth out or level the liquid layer, these disadvantages are completely avoided. The use of a jet or jets of air to smooth out or level the liquid mixture of foam-forming ingredients after application to the lower sheet of facing material and during the passage of the sheet across a fixed surface forms an additional feature of our invention.

The jet or jets of air capable of smoothing out or levelling the liquid layer may be obtained in various ways. One convenient arrangement is to have a perforated drum mounted above the lower sheet of facing material across the width of the sheet and placed after the foam dispensing device. The drum is caused to rotate and air is introduced into the drum through the ends by means of trunnions or the like. The air is expelled through the curved surface of the drum, through perforations made for the purpose, in a series of jets. If desired the top part of the curved surface of the drum may be enclosed by a fixed cover which prevents egress of air in the direction away from the lower sheet of facing material. In another convenient arrangement a pipe is mounted above the lower sheet of facing material across the width of the sheet and placed after the foam dispensing device. The pipe has a narrow slot along its length and, when the pipe is connected to a source of air, the air is expelled through the slot in the form of narrow jet continuous across the width of the sheet.

The laminated articles with which this invention is concerned have a plastic or resinous foam core sandwiched between and bonded to two outer sheets of facing material. The plastic or resinous foam core may be formed from any suitable foam-forming composition. It is particularly preferred, however, that the foam core consists of polyurethane. The polyurethane may be obtained in known manner from a suitable mixture of polyurethane-forming ingredients such as polyesters or polyethers containing hydroxyl groups and polyisocyanates together as desired with water, catalyst and other ingredients. The sheets of facing material may be composed of any suitable materials such as, for example, paper, wood, plastic, metal, rubber, paperboard, plasterboard or asbestos. Both of the sheets of facing material may be flexible and may be the same or different, or one may be flexible and the other rigid.

The fixed surface across which, according to the process of our invention, the lower sheet of facing material passes may be formed from any suitable material. Preferably it is formed from a material capable of giving a smooth surface and which is highly conducting, especially a metal, for example stainless steel.

Arrangements are preferably made for the fixed surface to be differentially heated or cooled in different zones of the surface in order to bring about effects on the liquid mixture of foam-forming ingredients as have already been described. This can be brought about for example by arranging for the fixed surface to be the upper surface of a platen or box. The platen or box contains heating elements or cooling elements beneath that part of the upper surface which it is desired to heat or cool. Heating elements may consist, for example, of electric heating elements, or pipes or chambers through which a hot liquid or gas, for example steam is passed. Cooling elements may consist for example of pipes or chambers through which a cold liquid or gas is passed, for example cold water or some other cooled or refrigerated liquid. In most cases, however, it is sufficient merely not to heat that part of the fixed surface which it is desired to keep cold. Zones of the fixed surface may also be heated by infrared heaters 31, or by induction heating.

The invention may now be illustrated by reference to the accompanying drawings wherein:

FIGURE 1 is a side view and partial section of apparatus for the manufacture of laminated articles having a plastic or resinous foam core; and FIGURE 2 is a side view of an alternative portion of the apparatus of FIGURE 1.

In the drawings, 1 is the lower flexible sheet of facing material, 2 is a guide roller and 3 is the forward part of one embodiment of the fixed surface in the form of a dispensing platform which is not heated and is slightly bowed, the convex surface being in contact with the lower sheet of facing material; 4 is the outlet from the foam dispensing device which traverses to and fro across the width of the lower sheet of facing material, which outlet is fitted with a nozzle which distributes the liquid mixture of foam-forming ingredients in a fan-shaped pattern 5; 6 is a pipe, slotted along its length, running across the width of the lower sheet of facing material; 7 is the backward part of the fixed surface which is bridged to forward part 3 by thin lateral supporting members 17 and which is heated; 8 is the swelling layer of foam; 9 is the upper flexible sheet of facing material; 10 is a guide roller; 11 is the upper conveying surface and 12 is the guide roller over which it passes; 13 is the lower conveying surface and 14 is the guide roller over which it passes; and 15 and 16 are heated platens backing the upper and lower conveying surfaces respectively.

In operating the machine the upper and lower conveying surfaces (11 and 13) are caused to move in the direction of the arrows. As a result of this motion the lower sheet of facing material 1 is drawn across the guide roller 2 on to the forward portion of the fixed surface 3 where the nozzle 4 dispenses on to the sheet a liquid mixture of foam-forming ingredients in a fan-shaped jet 5. The pipe 6, which is connected to a source of air, causes a jet of air to blow over the sheet, so assisting the mixture of foam-forming ingredients to form a flat, even liquid layer. The lower sheet of facing material is then drawn across the backward portion of the fixed surface 7 which is heated, and the foam starts to swell 8. As a result of the motion of the upper conveying surface 11 the upper sheet of facing material 9 is drawn over the guide roller 10 and meets the rising foam. The upper and lower sheets of facing material, with the foam between them, then pass through the nip formed by the upper and lower conveying surfaces as they pass over their respective guide rollers. Setting of the foam core is accomplished as the sandwich of foam and facing surfaces is conveyed between the heated platens.

As shown in FIGURE 2, the fixed surface can be the upper surface 18 of a platen or box 19 which can contain heating elements 20 or cooling elements 21 beneath that part of the upper surface which it is desired to heat or cool.

We claim:

1. Apparatus for the continuous manufacture of laminated articles having a polyurethane foam core sandwiched between and bonded to two outer sheets of facing material, at least one of said sheets being flexible, which comprises a conveyor system consisting essentially of spaced, upper and lower conveying means, for contacting respectively one of the two outer sheets of facing material and moving them in parallel disposition to each other, the lower conveying means contacting and conveying a flexible outer sheet, a fixed surface anterior to said conveyor system having a transverse extent substantially equal to the transverse extent of said lower flexible sheet and across which said lower flexible outer sheet passes before coming into contact with said conveyor system, said fixed surface being slightly curved in the direction in which the lower flexible outer sheet passes across, and a foam dispensing means above said fixed surface for applying a suitable mixture of polyurethane foam forming ingredients to the upper surace of said lower flexible outer sheet during its passage across said fixed surface.

2. The apparatus of claim 1 wherein the fixed surface contains gaps through which the lower flexible outer sheet is exposable to sources of radiant heat.

3. The apparatus of claim 2 wherein the gaps in the fixed surface are bridged by thin lateral supporting members.

4. The apparatus according to claim 1 wherein the fixed surface is the upper surface of a box containing heat transfer means.

5. The apparatus according to claim 1 wherein the foam dispensing means is fitted with a nozzle having a fan-shaped distribution pattern.

6. The apparatus according to claim 5 wherein the foam dispensing means is attached to a traverse system for moving said foam dispensing means laterally to and fro across the fixed surface and to raise or lower it relative to the fixed surface.

7. The apparatus according to claim 1 including a rotatable drum mounted above the fixed surface and posterior to said foam dispensing means, said drum having perforations in the curved surface thereof for expelling air therethrough and means for introducing air in the ends of said drum.

8. The apparatus according to claim 1 including a pipe mounted above the fixed surface and posterior to the foam dispensing means, said pipe being connected to a source of air and having a narrow slot in the length thereof for expelling air therethrough.

References Cited

UNITED STATES PATENTS

| | | | |
|---|---|---|---|
| 2,866,730 | 12/1958 | Potchen et al. | 156—79 |
| 2,956,310 | 10/1960 | Roop et al. | 156—79 |
| 3,174,887 | 3/1965 | Voelker | 156—79 |
| 3,219,502 | 11/1965 | Willy | 156—79 |
| 3,240,655 | 3/1966 | Voelker | 156—79 |

ROBERT F. BURNETT, *Primary Examiner.*

W. J. VAN BALEN, *Assistant Examiner.*

U.S. Cl. X.R.

18—4; 156—79, 550; 161—160, 161